P. McCAUL.
REPAIR CHAIN LINK.
APPLICATION FILED FEB. 19, 1913.
1,085,455.
Patented Jan. 27, 1914.
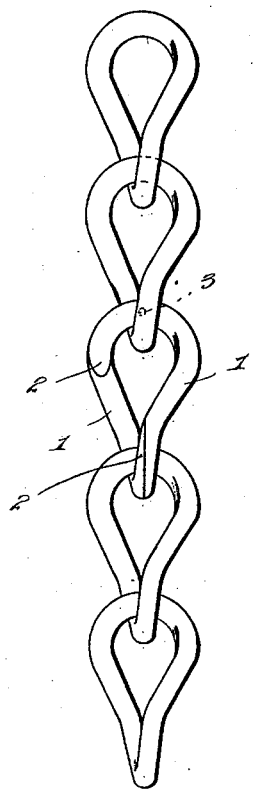
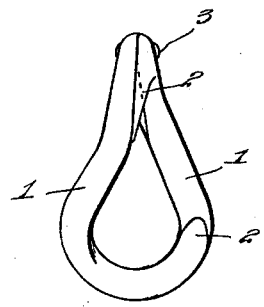
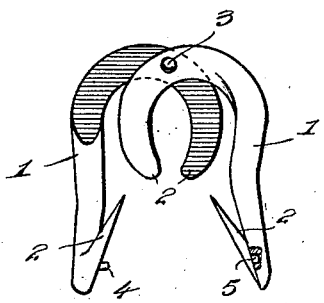
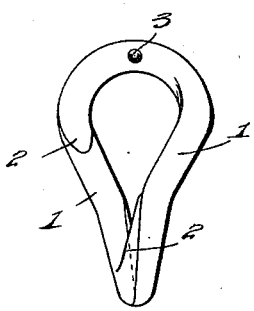
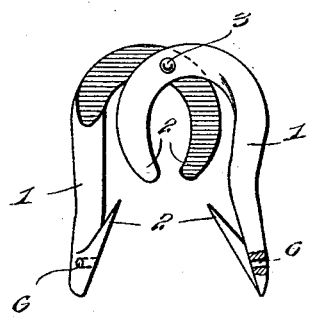
Witnesses
Chas. E. Kemper,
V. B. Hillyard.
Inventor
Philip McCaul.
By Victor J. Evans
Attorney

UNITED STATES PATENT OFFICE.

PHILIP McCAUL, OF TACOMA, WASHINGTON, ASSIGNOR OF ONE-HALF TO MILLARD T. HARTSON, OF TACOMA, WASHINGTON.

REPAIR CHAIN-LINK.

1,085,455.  Specification of Letters Patent.  Patented Jan. 27, 1914.

Application filed February 19, 1913.  Serial No. 749,476.

*To all whom it may concern:*

Be it known that I, PHILIP McCAUL, a citizen of the United States, residing at Tacoma, in the county of Pierce and State of Washington, have invented new and useful Improvements in Repair Chain-Links, of which the following is a specification.

The primary purpose of this invention is the provision of a separable link whereby a broken chain may be quickly repaired, thereby overcoming the inconvenience usually experienced when attempting to join the ends of a broken chain.

The invention provides a link which in general appearance is not wholly unlike the links comprising the chain, but which link is separable and comprises like parts or members which when placed together unitedly form a link, the parts of the link either being positively secured or retained in place by friction or linear strain upon the chain.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 is a detail view of a short length of chain embodying a separable or quick repair link embodying the invention. Fig. 2 is a view of the repair link in elevation. Fig. 3 is a view of the link as it appears when seen at a right angle to Fig. 2. Fig. 4 is a detail view of the link separated at one end to admit of the introduction or removal of a link of the chain to be repaired. Fig. 5 is a view similar to Fig. 4, showing the separable ends of the link members provided with openings to receive a fastening.

Corresponding and like parts are referred to in the following description, and indicated in all the views of the drawing, by the same reference characters.

While the link illustrated is designed to form an element of a chain having links of the twisted type it is to be understood that the link may be used for repairing chains having links of the straight type or other variety.

The essential feature of the invention is a quick repair link embodying members or parts of like form, thereby admitting of the elements being assembled with either end of one opposite the other. The link shown is of the twisted type, thereby throwing one end in a plane at a right angle to the opposite end.

The link comprises two members 1 which are of like formation, each of such members having a hook 2 at opposite ends, such hooks being transversely tapered so that when the two parts or members are placed together the outline of the link opposite the joints will correspond with the outline of the main or body portion of the members. The hooks 2 are of such a depth as to prevent their straightening when the link is subjected to usual strain and also to prevent spreading of the members or parts when the chain is subjected to tension. It is proposed to connect the parts or members 1 at one end by means of a pivot fastening 3, which may be of any formation, such as a pin, stud or like part. The hooks at the opposite end of the link are usually free, as indicated most clearly in Figs. 2 and 3, but fastening means may be employed, as indicated in Fig. 4, the same consisting of a stud 4 projecting laterally from one hook to enter an opening 5 formed in the companion hook. As indicated in Fig. 5 both hooks at the free ends of the members may be formed with openings 6 to receive a pin or other fastening.

When it is required to join the ends of a broken chain or to connect two chains the coupling may be quickly effected by means of the repair link, it being necessary only to separate adjacent ends of the link members, as shown most clearly in Figs. 4 and 5, so that the link may be slipped upon one of the members of the repair link, after which the separated ends of the latter are brought together, thereby retaining the link together connected upon the repair link.

The invention provides means whereby a broken chain may be quickly repaired until permanent repairs may be made by coupling the links of the broken chain by means of a welded link.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A quick repair link for the purpose herein specified, the same comprising similar members each provided at opposite ends with hooks one of such hooks being in a plane at a right angle to the other hook and both hooks tapering toward their extremities, said members being placed with corresponding hooks in opposition, the hooks at one end of the link being pivotally connected and one of the hooks at the opposite end having an opening and the remaining hook being provided with a stud to enter such opening when the hooks are closed to form the link.

In testimony whereof I affix my signature in presence of two witnesses.

PHILIP McCAUL.

Witnesses:
 MILLARD S. HARTSON,
 FLOYD J. GIBBONS.

---

Copies of this patent may be obtained for five cents each, by addressing the "Commissioner of Patents, Washington, D. C."